United States Patent
Alfred et al.

(10) Patent No.: US 8,527,884 B2
(45) Date of Patent: Sep. 3, 2013

(54) SYSTEM AND METHOD FOR BROWSING BASED ON USER RECOGNITION

(75) Inventors: Joseph Anderson Alfred, Somerset, NJ (US); Joseph M. Sommer, Rutherford, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 795 days.

(21) Appl. No.: 12/339,889

(22) Filed: Dec. 19, 2008

(65) Prior Publication Data

US 2010/0162125 A1 Jun. 24, 2010

(51) Int. Cl.
*G06F 3/00* (2006.01)
(52) U.S. Cl.
USPC .......................................... 715/738; 715/745
(58) Field of Classification Search
USPC ................. 715/727, 728, 738, 744, 745, 747; 726/27, 28, 3; 704/246
See application file for complete search history.

(56) References Cited

U.S. PATENT DOCUMENTS

| | | | | |
|---|---|---|---|---|
| 6,338,059 B1* | 1/2002 | Fields et al. | ................... | 715/208 |
| 7,599,955 B2* | 10/2009 | Yoon et al. | ................ | 707/999.01 |
| 2002/0103933 A1* | 8/2002 | Garon et al. | ................... | 709/246 |
| 2005/0165811 A1* | 7/2005 | Lee et al. | ....................... | 707/100 |
| 2006/0034287 A1* | 2/2006 | Novack et al. | ............. | 370/395.2 |
| 2009/0077163 A1* | 3/2009 | Ertugrul et al. | ................ | 709/203 |
| 2010/0211636 A1* | 8/2010 | Starkenburg et al. | .......... | 709/203 |

* cited by examiner

*Primary Examiner* — Haoshian Shih

(57) ABSTRACT

Disclosed herein are systems, computer-implemented methods, and computer-readable media for browsing based on user recognition. The method includes receiving input from a user, verifying a user identity based on the input, identifying a browsing device of the user, retrieving a user profile associated with the user and the identified browsing device, the profile storing browser settings, and launching a browser on the identified browsing device with browser settings from the retrieved user profile. The input can be speech. The user identity can be verified by network-based speaker recognition. The method can further automatically update the user profile based on user actions. In one aspect, the method further identifies a preferred browser in the user profile, provisions a version of the preferred browser adapted to the identified browsing device, and launches the provisioned preferred browser on the identified browsing device with settings from the retrieved user profile.

20 Claims, 8 Drawing Sheets

SYSTEM AND METHOD FOR BROWSING BASED ON USER RECOGNITION

BACKGROUND OF THE INVENTION

1. Field of the Invention

The present invention relates to web browsing and more specifically to web browsing using speech and speaker recognition.

2. Introduction

Web browsing has become omnipresent in the last 15 years. Especially in the last 10 years, web browsing has shifted from an almost exclusively desktop setting to an on-the-go, everywhere setting. More and more devices offer web browsing features, including the following devices: personal digital assistants (PDAs), smart phones, television set-top boxes, gaming consoles, handheld video gaming devices, and GPS devices. With these new devices, users increasingly access the Internet with multiple browsing devices. For example, a user can access the Internet with K-Meleon on a Windows XP computer at home, with Safari on an Apple iPhone on the go, with Internet Explorer at work, and with Mozilla Firefox on a friend's Ubuntu Linux laptop. One of the problems with current browser interfaces is that browsers do not recognize that a user often uses multiple devices and multiple browsers and can have preferences for the way he or she works with a particular device or browser. In other words, browsers are not currently aware of the connection between a user and a device or a user and a browser. For example, a person uses Internet Explorer on multiple work computers in one way and uses Firefox at home on a desktop and a laptop in different way. Today's browsers are disjointed and operate separately one from another, which leads to user annoyance and frustration. Users are unable to maintain consistency in a browsing experience at a user-device or a user-browser level.

Accordingly, what is needed in the art is a way to unify web browsing preferences at a user-device level.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, methods, and tangible computer readable-media for browsing based on user recognition. The method includes receiving input from a user, verifying a user identity based on the input, identifying a browsing device of the user, retrieving a user profile associated with the user and the identified browsing device, the profile storing browser settings, and launching a browser on the identified browsing device with browser settings from the retrieved user profile. The input can be speech. The user identity can be verified by network-based speaker recognition. The method can further automatically update the user profile based on user actions. The method can further include adapting a user profile associated with the user and a first browsing device for use with the user and a second browsing device. In one aspect, the method further identifies a preferred browser in the user profile, provisions a version of the preferred browser adapted to the identified browsing device, and launches the provisioned preferred browser on the identified browsing device with settings from the retrieved user profile. A separate user profile can exist for each browsing device for each user. A separate user profile can exist for each browser for each user. User profiles can include a default search engine.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
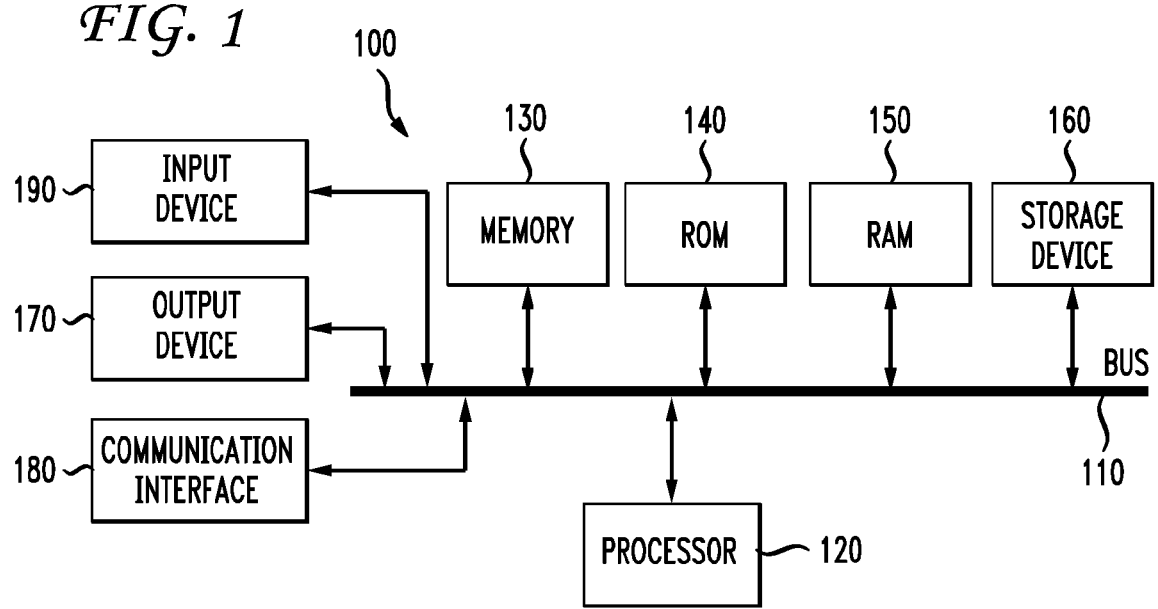
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. A processing unit 120 can include a general purpose CPU controlled by software as well as a special-purpose processor. An Intel Xeon LV L7345 processor is an example of a general purpose CPU which is controlled by software. Particular functionality may also be built into the design of a separate computer chip. An STMicroelectronics STA013 processor is an example of a special-purpose processor which decodes MP3 audio files. Of course, a processing unit includes any general purpose CPU and a module configured to control the CPU as well as a special-purpose processor where software is effectively incorporated into the actual processor design. A processing unit may essentially be a completely self-contained computing system, containing multiple cores or CPUs, a bus, memory controller, cache, etc. A multi-core processing unit may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software and hardware, such as a processor, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Figure 2:
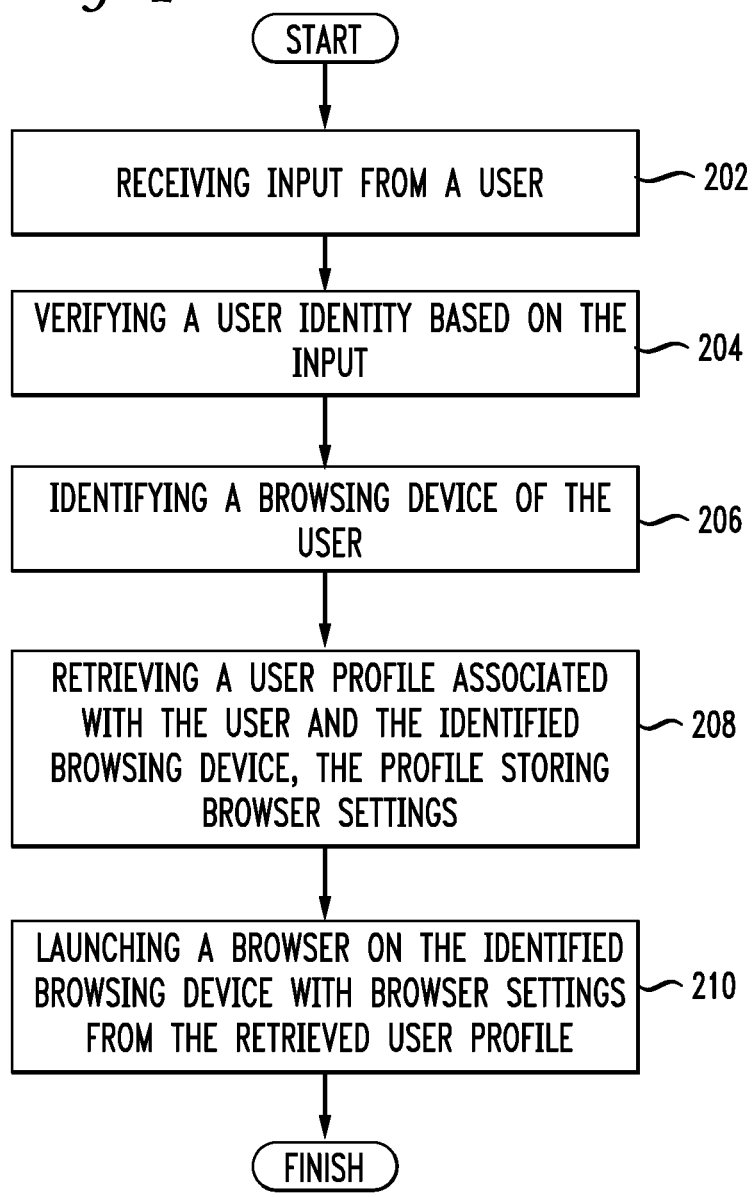
FIG. 2 illustrates an example method embodiment.

Having disclosed some fundamental system components, the disclosure turns to the example method embodiment as shown in FIG. 2. For the sake of simplicity, the example method embodiment is discussed in terms of a system configured to practice the method. The system receives input from a user (202). Input can be speech, biometric, keycard based, username/password based, etc. The system can initially receive speech at a browsing device or at a separate module from the browsing device. The system can implement various security features to ensure that the received speech is not a recording, for example. The system verifies a user identity based on the input (204). The system can use network-based speaker recognition to verify user identity if the input is speech, for example. The network-based speaker recognition can verify the user's identity using multiple speech recognition engines working together. For example, a computing cluster or cloud can verify many speakers at once. A large service provider, such as AT&T™, can provide this service to many thousands of customers with a central or distributed computing cloud. The system verifies user identities based on matching received speech to an existing speech pattern or speech sample. For example, a user submits an initial speech sample to the speaker recognition module. Later, when the user submits speech to the speaker recognition module, the system can match the speech to the previously submitted speech sample in order to positively identify the user.

The system identifies a browsing device of the user (206). The browsing device, such as a personal computer, a PDA, a smart phone, a video game console, a gaming handheld, a set-top box, or a GPS device, can transmit identification data to a server. In some cases, the system identifies the browsing device based on an initial HTTP request including a user agent string. A sample user agent string from Safari 3.1.1 on an Apple iPhone is "Mozilla/5.0 (iphone; U; CPU iPhone OS 2_1 like Mac OS X; en-us) AppleWebKit/525.18.1 (KHTML, like Gecko) Version/3.1.1 Mobile/5F136 Safari/525.20". A sample user agent string from Firefox 3.03 on a personal computer running Windows XP is "Mozilla/5.0 (Windows; U; Windows NT 5.1; en-US; rv:1.9.0.3) Gecko/2008092417 Firefox/3.0.3". A sample user agent string from Opera running on a Nintendo Wii™ gaming console is "Opera/9.23 (Nintendo Wii; U; 1038-58; Wii Internet Channel/1.0; en)". Instead of passively waiting for the browsing device to identify itself, the system can request identification from the browsing device. When the system cannot find explicit information identifying a browsing device, the system can infer the type of browsing device based on available information. For instance, if the system receives a user agent string of "mothra/Jul-10-17:33:30-EDT-2006", the system can infer that the browsing device is a computer running the Plan 9 operating system because the Mothra browser is only available on Plan 9.

The system retrieves a user profile associated with the user and the identified browsing device, the profile storing browser settings (208). The system can store a separate user profile for each browsing device for each user. For example, the system stores a separate profile for John Smith using a mobile phone, for John Smith using a desktop computer, for John Smith using a set-top box, and so on. Users can have different preferences for each location or can preserve the same preferences across multiple devices, which can require a module to propagate changes from one profile to other designated profiles.

The system can store user profiles in a network location so they are accessible to networked devices in virtually any location. For example, if John Smith has iPhone preferences stored in the network for use with his personal iPhone, he can access those same preferences when he uses an iPhone borrowed from a friend because it is the same device and the same user. In one aspect, profiles are user-editable, including user preferences for web browsing and usage preferences guiding how the profile is used on multiple devices. User profiles can include, for example, a default search engine, a list of bookmarks, security settings, usernames, passwords, browsing history across devices, home page, plugins, cookies, and RSS feeds.

The system launches a browser on the identified browsing device with browser settings from the retrieved user profile (210). For example, if a first user is browsing with Camino on Mac OS X, the system launches the Camino browser with the first user's default search engine, bookmarks, browsing history, etc. When the first user abdicates the computer to a second user, the second user submits user input, such as a speech sample. The system identifies the second user, retrieves the second user's profile, and launches the second user's preferred browser, Safari, with the second user's default search engine, bookmarks, privacy settings, browsing history, etc. In this way, a user can use the same preferences on any browsing device. The system can store a separate user profile for each browsing device for each user. The system can store a separate user profile for each browser for each user.

The system can further automatically update the user profile based on user actions. For instance, if a user adds a bookmark in one location, that change is propagated back to the user profile so the same added bookmark is available on other devices. The system can adapt a user profile associated with the user and a first browsing device for use with the user and a second browsing device. For instance, if Mark has a user profile for Internet Explorer on Windows, but is using a PDA, for which he has no user profile, the system can adapt Mark's settings from Internet Explorer to the PDA's browser as closely as possible given the constraints of the browser and the PDA.

The system can further identify a preferred browser in the user profile, provision a version of the preferred browser adapted to the identified browsing device, and launch the provisioned preferred browser on the identified browsing device with settings from the retrieved user profile. For example, Mozilla Firefox uses a nearly universal XML format for bookmarks and other settings. If Mark has a Mozilla Firefox profile for a Mac OS X computer, but the Mac computer he is working on does not have Mozilla Firefox installed, the system can provision a portable version of Mozilla Firefox to the Mac computer incorporating Mark's profile. Portable versions are one way to provision a browser; other ways exist and will be recognized by one of skill in the art.

In the case of set-top boxes, for example, the system can launch the browser in a picture-in-picture format on a display on the browsing device. This allows web browsing to occur side by side with television viewing. This approach can be advantageous to allow television viewers to shop or research online without seriously interrupting a television broadcast.

Figure 3:
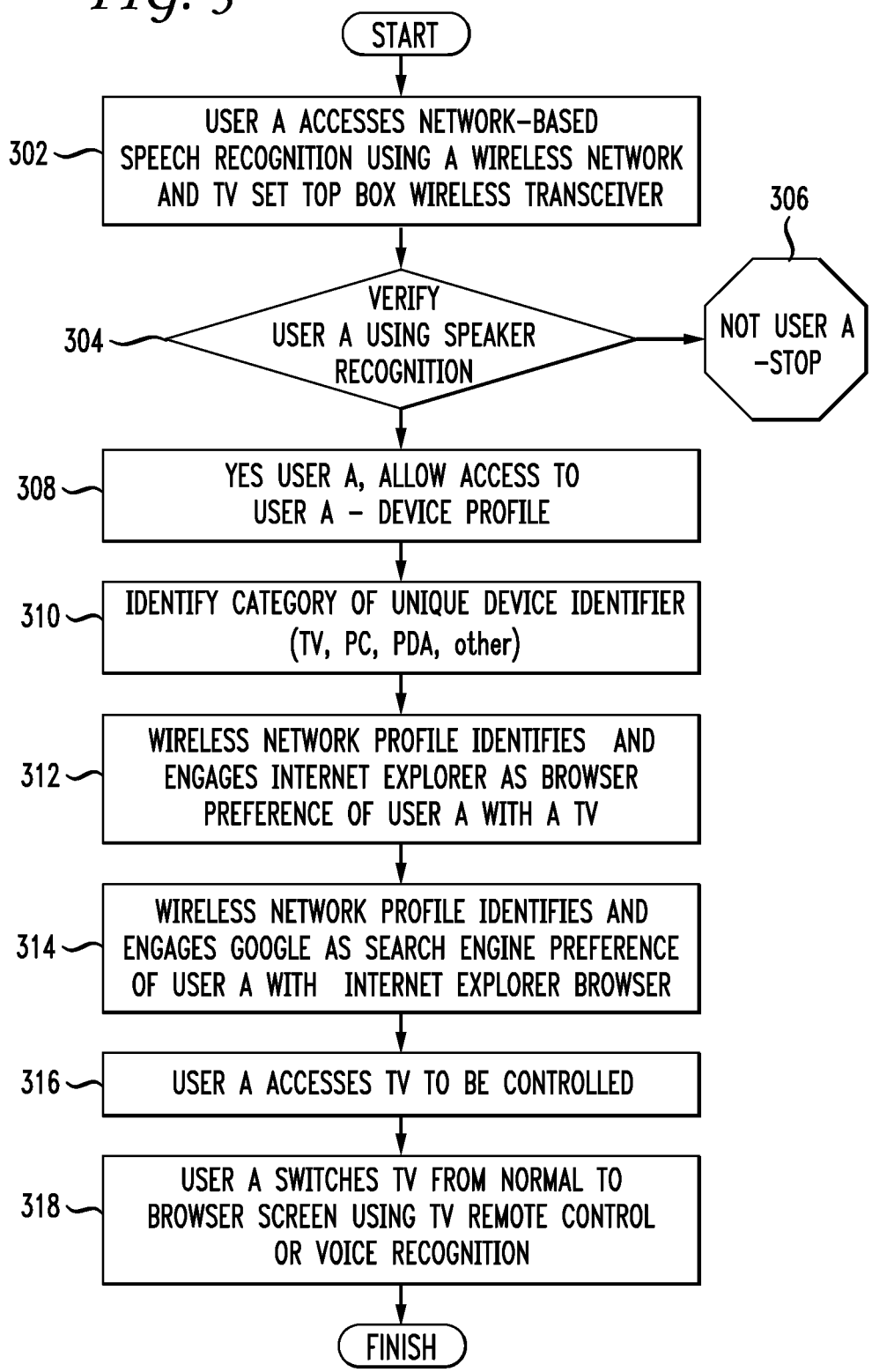
FIG. 3 illustrates a sample flowchart of user A controlling a television.

FIG. 3 illustrates a sample flowchart of user A controlling a television. User A accesses network-based speaker recognition using a wireless network and a TV set-top box wireless transceiver 302. The system verifies user A's identity using speaker recognition 304. If the speech is not from user A, the system stops 306. If the speech is from user A, the system allows access to the profile for user A for this device 308. The system identifies the category of the unique device identifier, such as a television, computer, or PDA 310. The system identifies a wireless network profile and launches Internet Explorer as user A's preferred browser on a television 312. The system sets Google as the default because the profile indicates Google is user A's preferred search engine on Internet Explorer 314. At this point, user A accesses the television 316 and can begin using the browser. User A can switch between the normal screen and the browser screen 318 using a remote control, voice commands, keyboard, mouse, or other user interface devices.

Figure 4:
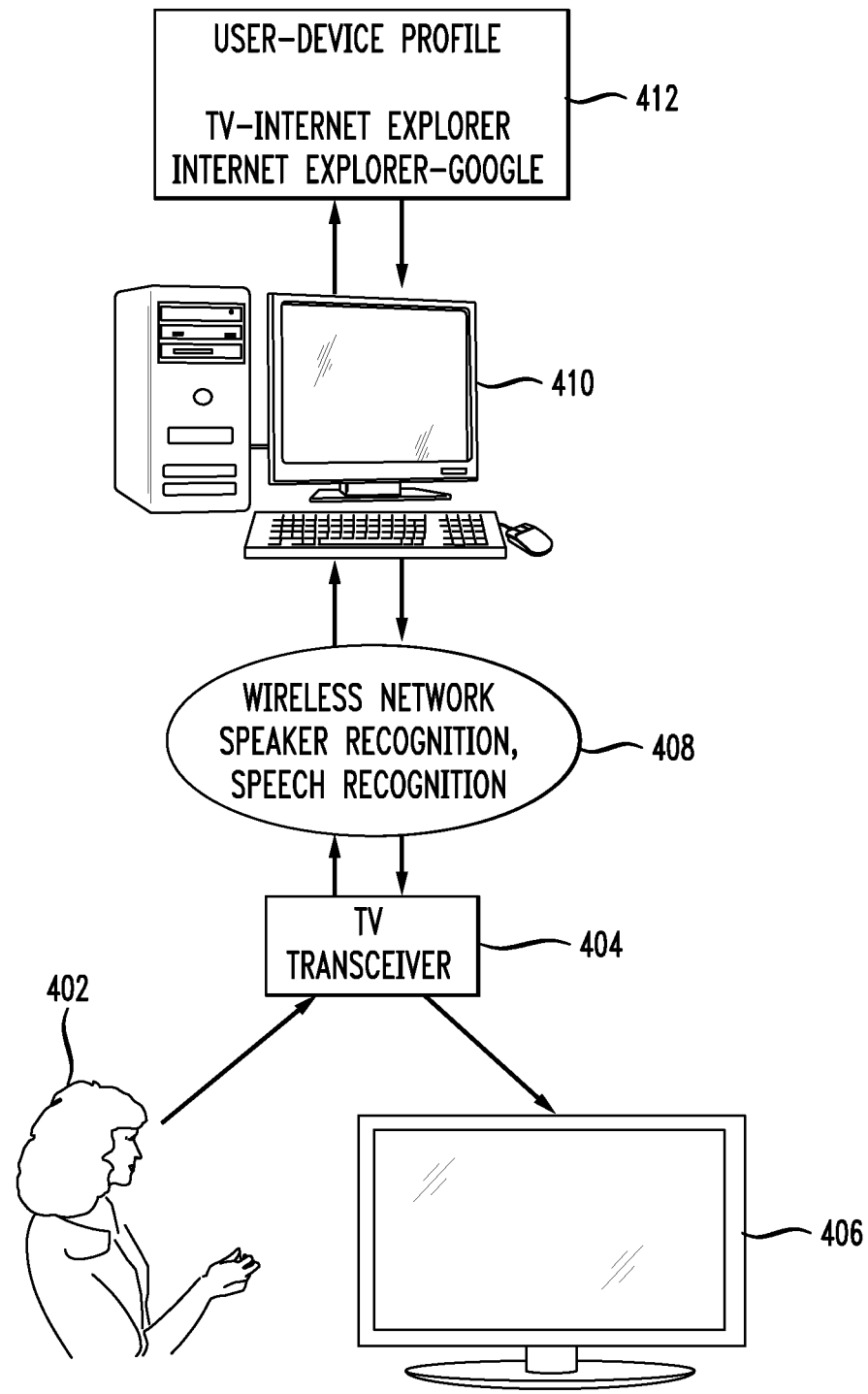
FIG. 4 illustrates a sample system for allowing user A to control a television.

FIG. 4 illustrates a sample system for allowing user A to control a television as described in FIG. 3. The user 402 asks to browse the Internet through the transceiver 404 connected to a television 406. The TV transceiver 404 transmits a user speech sample to a wireless network speaker recognition module 408. If the speaker recognition module positively identifies the user, a server 410 retrieves the user-device profile 412 for the given user and the given device. That information is relayed back from the server 410 to the transceiver 404 which launches a browser on the television display 406 with the settings and preferences from the user profile.

Figure 5:
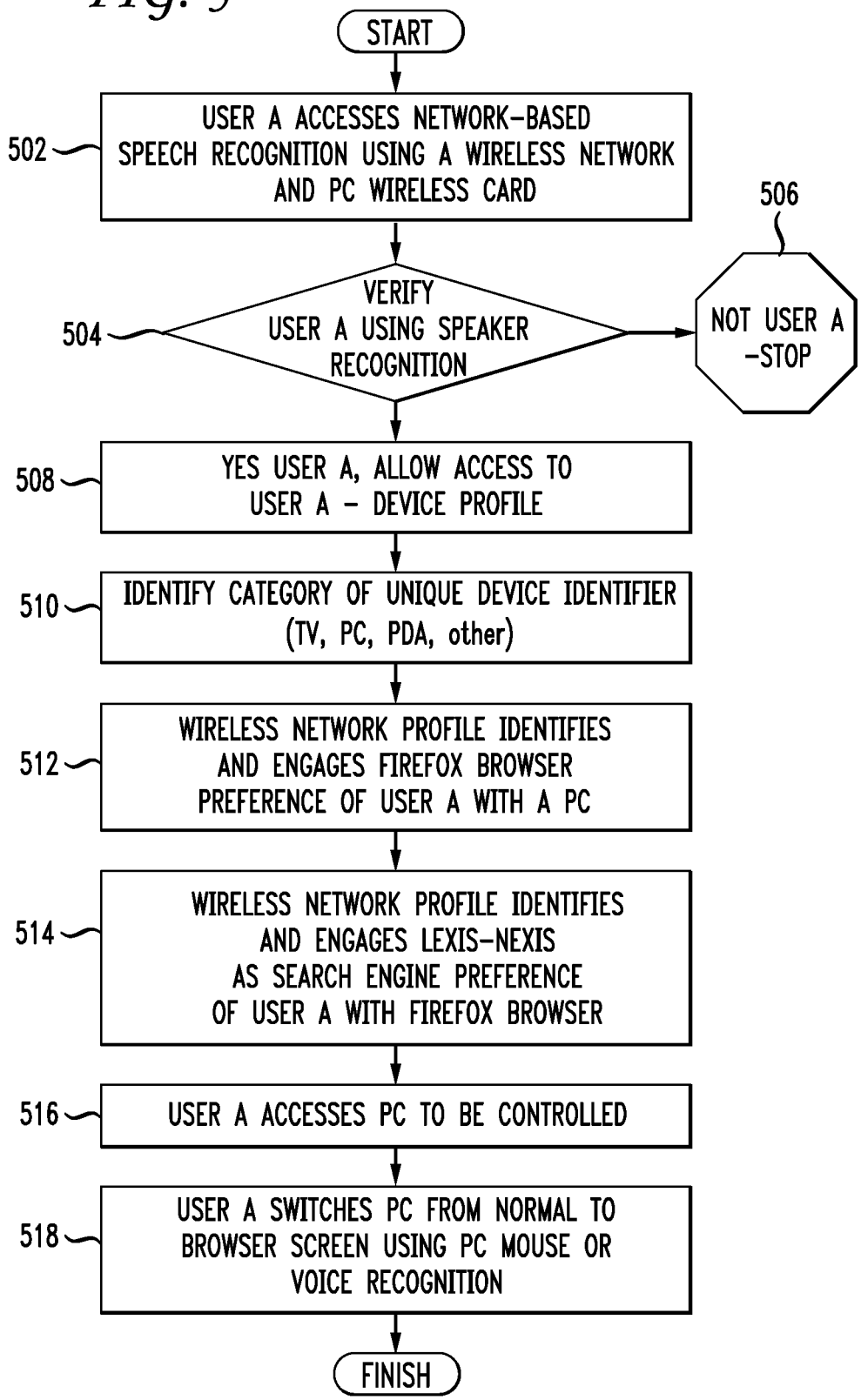
FIG. 5 illustrates a sample flowchart of user A controlling a computer.

FIG. 5 illustrates a sample flowchart of user A controlling a computer. User A accesses network-based speaker recognition using a wireless network and a personal computer wireless connection 502. The system verifies user A's identity using speaker recognition 504. If the speech is not from user A, the system stops 506. If the speech is from user A, the system allows access to the profile for user A for this device 508. The system identifies the category of the unique device identifier, such as a television, computer, or PDA 510. The system identifies a wireless network profile and launches Mozilla Firefox as user A's preferred browser on a personal computer 512. The system sets Lexis-Nexis as the default because the profile indicates Lexis-Nexis is user A's preferred search engine on Mozilla Firefox or on a personal computer 514. At this point, user A accesses the personal computer 516 and can begin using the browser. User A can switch between the normal screen and the browser screen 518 using a remote control, voice commands, keyboard, mouse, or other user interface devices.

Figure 6:
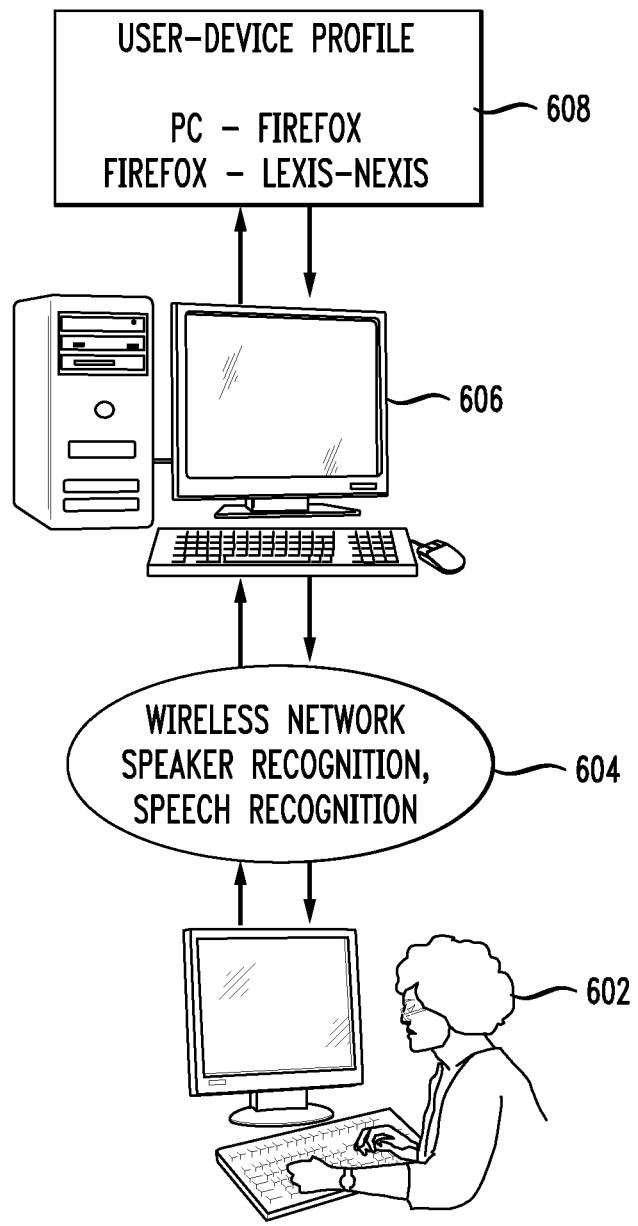
FIG. 6 illustrates a sample system for allowing user A to control a computer.

FIG. 6 illustrates a sample system for allowing user A to control a computer as described in FIG. 5. The user asks to browse the Internet through a personal computer 602. The personal computer 602 transmits a user speech sample to a wireless network speaker recognition module 604. If the speaker recognition module positively identifies the user, a server 606 retrieves the user-device profile 608 for the given user and the given device. The server 606 relays that information back to the personal computer 602 which launches a browser with the settings and preferences from the user profile 608.

Figure 7:
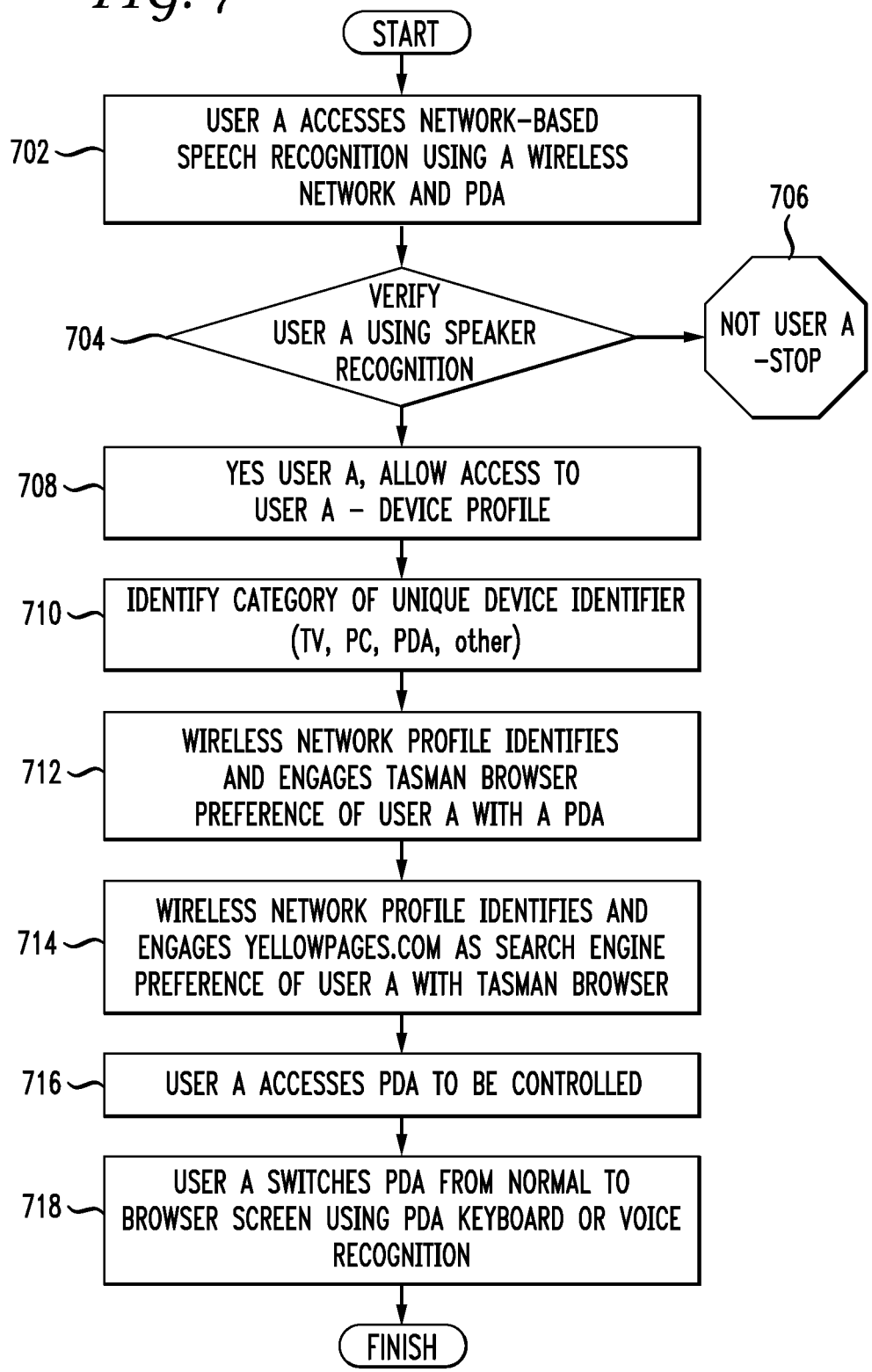
FIG. 7 illustrates a sample flowchart of user A controlling a personal digital assistant (PDA)

FIG. 7 illustrates a sample flowchart of user A controlling a personal digital assistant (PDA). User A accesses network-based speaker recognition using a wireless network from the PDA, such as 802.11x, EDGE, CDMA, or 3G 702. The system verifies user A's identity using speaker recognition 704. If the speech is not from user A, the system stops 706. If the speech is from user A, the system allows access to the profile for user A for this device 708. The system identifies the category of the unique device identifier, such as a television, computer, or PDA 710. The system identifies a wireless network profile and launches Opera Mini as user A's preferred browser on a PDA 712. The system sets YellowPages.com as the default because the profile indicates YellowPages.com is user A's preferred search engine on Opera Mini or on a PDA 714. At this point, user A accesses the PDA 716 and can begin using the browser. User A can switch between the normal screen and the browser screen 718 using screen taps, hand writing, stylus gestures, voice commands, keyboard, or other user interface devices.

Figure 8:
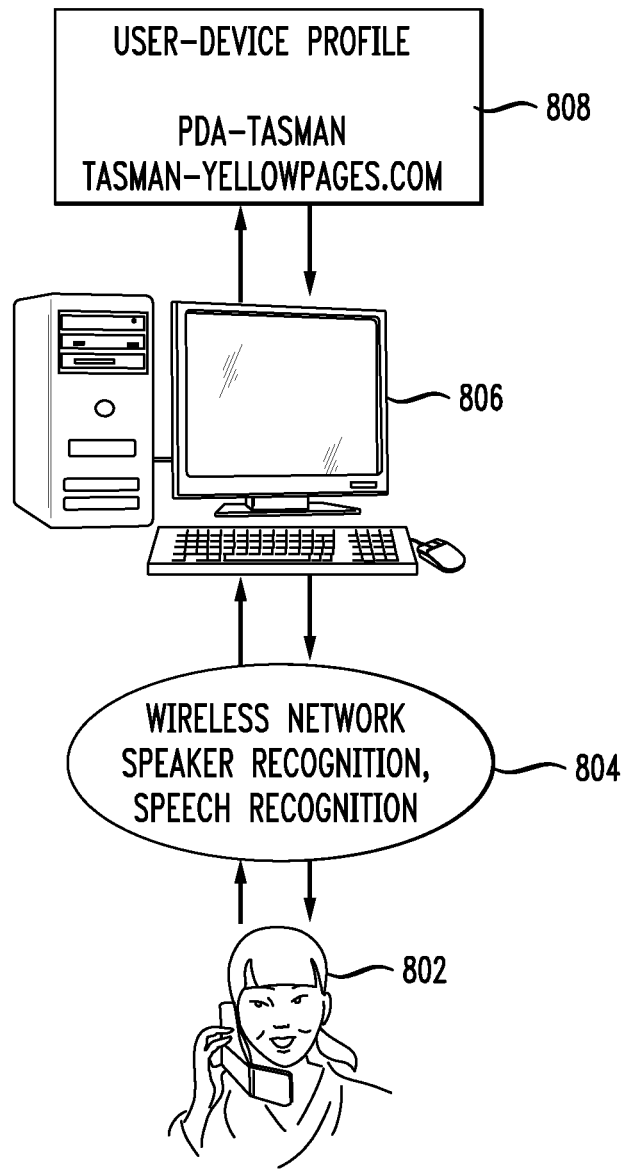
FIG. 8 illustrates a sample system for allowing user A to control a PDA.

FIG. 8 illustrates a sample system for allowing user A to control a PDA as described in FIG. 7. The user asks to browse the Internet through a PDA or smart phone 802. The PDA or smart phone 802 transmits a user speech sample to a wireless network speaker recognition module 804. If the speaker recognition module positively identifies the user, a server 806 retrieves the user-device profile 808 for the given user and the given device. The server 806 relays that information back to the PDA or smart phone 802 which launches a browser with the settings and preferences from the user profile 808.

Certain devices can store local user preferences that are the default combination when the device is turned on. These devices can use the default user preferences until the server retrieves the user-device profile or when browsing local network resources without access to the server and/or the rest of the Internet. In some cases, the device can update the local user preferences based on recently received user profiles.

Embodiments within the scope of the present invention may also include computer-readable media for carrying or having computer-executable instructions or data structures stored thereon. Such computer-readable media can be any available media that can be accessed by a general purpose or special purpose computer, including the functional design of any special purpose processor as discussed above. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, data structures, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the principles herein are applicable to nearly any network-enabled device, mobile or non-mobile, which includes a microphone for recording user speech. Some examples of such devices are desktop and laptop computers, set-top boxes, video game consoles, smart phones, and GPS systems. Those skilled in the art will readily recognize various modifications and changes that may be made to the present invention without following the example embodiments and applications illustrated and described herein, and without departing from the true spirit and scope of the present invention.

We claim:

1. A method comprising:
    verifying a user identity based input from a user;
    identifying a browsing device of the user to yield an identified browsing device;
    retrieving a user profile associated with the user and the identified browsing device to yield a retrieved user profile storing browser preferences for a specific web browser;
    if the specific web browser is available on the browsing device, launching an instance of the specific web browser on the identified browsing device with the browser preferences; and
    if the specific web browser is not available on the browsing device, provisioning and launching a portable version of the specific web browser for the identified browsing device based on the browser preferences.

2. The method of claim 1, wherein the input is speech.

3. The method of claim 2, wherein the user identity is verified by network-based speaker recognition.

4. The method of claim 1, further comprising automatically updating the user profile based on user actions.

5. The method of claim 1, further comprising adapting the user profile associated with the user and a first browsing device for use with the user and a second browsing device.

6. The method of claim 1, further comprising:
    identifying a preferred browser in the user profile;
    provisioning a version of the preferred browser adapted to the identified browsing device; and
    launching the version of the preferred browser on the identified browsing device with preferences from the retrieved user profile.

7. The method of claim 1, wherein the user profile is stored in a network location.

8. The method of claim 1, wherein a separate user profile exists for each browsing device for each user.

9. The method of claim 1, wherein a separate user profile exists for each web browser for each user.

10. The method of claim 1, wherein the user profile includes a default search engine.

11. A system comprising:
a processor;
a memory storing instructions for controlling the processor to perform a method comprising:
verifying a user identity based on input from a user;
identifying a browsing device of the user to yield an identified browsing device;
retrieving a user profile associated with the user and the identified browsing device to yield a retrieved user profile storing browser preferences for a specific web browser;
a if the specific web browser is available on the browsing device, launching an instance of the specific web browser on the identified browsing device with browser preferences; and
if the specific web browser is not available on the browsing device, provisioning and launching a portable version of the specific web browser for the identified browsing device based on the browser preferences.

12. The system of claim 11, wherein the input is speech.

13. The system of claim 12, wherein the user identity is verified via network-based speaker recognition.

14. The system of claim 11, the instructions further controlling the processer to automatically update the user profile based on user actions.

15. The system of claim 11, the instructions further controlling the processer to adapt the user profile associated with the user and a first browsing device for use with the user and a second browsing device.

16. The system of claim 11, the instructions further controlling the processer to perform steps comprising:
identifying a preferred browser in the user profile;
provisioning a version of the preferred browser adapted to the identified browsing device; and
launching the version of the preferred browser on the preferred browsing device with preferences from the user profile.

17. A non-transitory computer-readable storage medium storing a computer program having instructions for controlling a computing device to perform steps comprising:
verifying a user identity based on input from a user;
identifying a browsing device of the user to yield an identified browsing device;
retrieving a user profile associated with the user and the identified browsing device to yield a retrieved user profile storing browser preferences for a specific web browser;
if the specific web browser is available on the browsing device, launching an instance of the specific web browser on the identified browsing device with the browser preferences; and
if the specific web browser is not available on the browsing device, provisioning and launching a portable version of the specific web browser for the identified browsing device based on the browser preferences.

18. The non-transitory computer-readable storage medium of claim 17, wherein the input is speech.

19. The non-transitory computer-readable storage medium of claim 18, wherein the user identity is verified by network-based speaker recognition.

20. The non-transitory computer-readable storage medium of claim 17, the method further comprising automatically updating the user profile based on user actions.

\* \* \* \* \*